United States Patent [19]

Andersson

[11] Patent Number: 4,537,553

[45] Date of Patent: Aug. 27, 1985

[54] ARRANGEMENT IN A SILO OR THE LIKE FOR STORING PULVERULENT, GRANULAR OR LUMPY MATERIAL, SUCH AS COAL

[75] Inventor: Sven Å. Andersson, Tyringe, Sweden

[73] Assignee: Nils Weibull AB, Sweden

[21] Appl. No.: 494,086

[22] Filed: May 12, 1983

[30] Foreign Application Priority Data

May 17, 1982 [SE] Sweden .................................. 8203068

[51] Int. Cl.³ ............................................. B65G 65/46
[52] U.S. Cl. .................................... 414/302; 198/511; 198/519
[58] Field of Search ........ 414/298, 300, 302, 313–317, 414/319–321, 305, 144, 145; 198/511, 518, 519

[56] References Cited

U.S. PATENT DOCUMENTS

| | | | |
|---|---|---|---|
| 794,754 | 7/1905 | Warriner | 414/300 |
| 3,446,371 | 5/1969 | Nicolas | 414/300 X |
| 3,524,557 | 8/1970 | Bakker | 414/302 X |
| 3,554,392 | 1/1971 | Ivstedt | 414/319 X |
| 3,826,385 | 7/1974 | Bluntzer | 414/302 X |
| 4,022,335 | 5/1977 | Lambert, Jr. | 414/302 X |

Primary Examiner—Robert J. Spar
Assistant Examiner—David A. Bucci
Attorney, Agent, or Firm—Shapiro and Shapiro

[57] ABSTRACT

A silo or the like for storing pulverulent, granular or lumpy material has a wall which encloses the silo storage space, a roof whose pitch substantially corresponds to the angle of repose of the material, an inlet opening in the silo roof, an outlet opening in the silo floor, and a screw conveyor suspended from a beam rotatable about the axis of the silo. The beam is inclined downwardly from the inlet opening of the silo and extends substantially parallel to the roof pitch, and the conveyor is suspended from the beam by means of wires which are adjustable independently of each other with respect to their length. The conveyor can thus be anchored close and parallel to the supporting beam when material is fed into the silo, and be disposed at a suitable angle, preferably inclined downwardly toward the center of the silo, when material is discharged from the silo.

1 Claim, 1 Drawing Figure

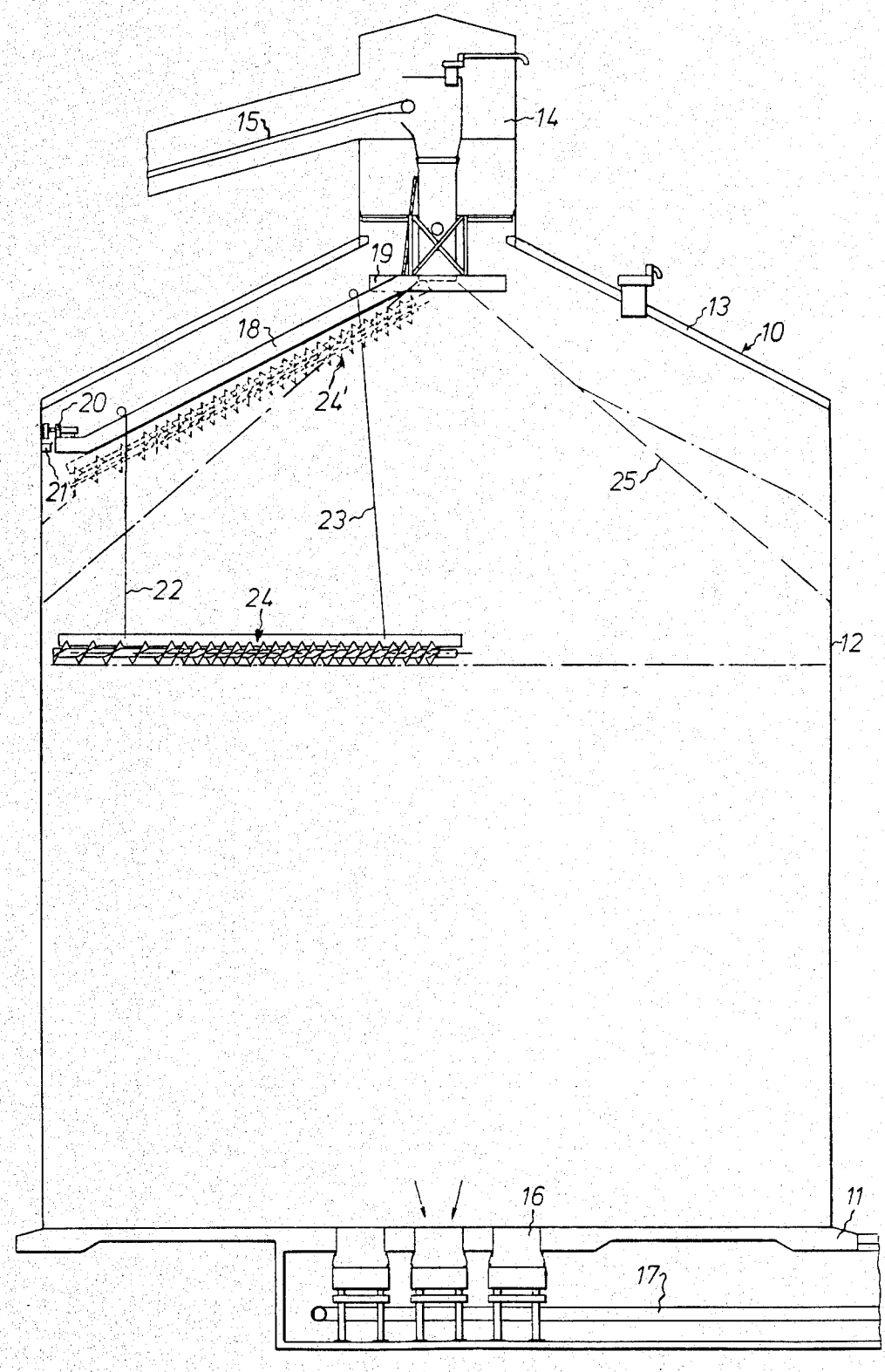

ARRANGEMENT IN A SILO OR THE LIKE FOR STORING PULVERULENT, GRANULAR OR LUMPY MATERIAL, SUCH AS COAL

The present invention relates to an arrangement in a silo or the like for storing pulverulent, granular or lumpy material, such as coal, comprising a wall defining the silo storage space, and a roof which is supported by said wall and the pitch or angle of inclination of which substantially corresponds to the angle of repose of the material to be stored in the silo, a central material inlet opening in said silo roof, at least one central discharge opening in the silo floor, and at least one screw conveyor which extends substantially from the center of the silo to a location adjacent the silo wall and is suspended from a supporting beam located at the top of the silo and rotatable about the axis of the silo.

In coal-fired power and heating plants, the coal is traditionally stored in large heaps which are not only unaesthetic but also involve handling problems. This gave birth to the idea of building silos for storing the coal and thus the problems could be solved. Especially silos of the type stated by way of introduction proved useful. However, they suffered from one drawback, viz. that is was not possible to use the full silo storage space available because of the horizontally suspended screw conveyor or, alternatively, the screw conveyor was buried in coal. In some instances, it has also proved difficult to discharge all the material in the silo by means of the screw conveyor.

The object of the present invention is to solve the last-mentioned problem, which is achieved in that the supporting beam is so arranged as to be inclined downwardly from said material inlet opening towards said silo wall, substantially in agreement with said roof pitch or angle of inclination, and that the conveyor is suspended from the beam by means of wires which are adjustable independently of each other with respect to their length.

In the use of a silo thus equipped, the screw conveyor is quite simply hoisted to a position parallel and close to the supporting beam, such that the screw conveyor will also extend substantially in parallel with the angle of repose of the material to be stored in the silo. If the top surface of the material in the silo need be evened out, the screw conveyor is quite simply lowered from its raised position and is given a suitable angle, for instance an inwardly or outwardly inclined position or a horizontal position, whereupon the supporting beam is rotated the required number of revolutions. When the material is to be discharged from the silo, such an amount of material is first removed from the silo that a crater is formed in the material in the central part of the silo, and the screw conveyor is thereafter lowered and inclined inwardly-downwardly, whereupon the supporting beam is rotated and an even outflow is ensured.

In the foregoing, reference has been made mostly to coal, but it will be understood that the invention is also very useful for other lumpy materials, as well as pulverulent and granular materials.

The invention will be described in greater detail hereinbelow with reference to the accompanying drawing which schematically illustrates one embodiment thereof.

In the drawing, there is shown a silo 10 which is disposed on a base plate 11 forming the floor of the silo, and which has a cylindrical wall 12 and a sloping roof 13. A feed housing 14 of conventional design is disposed centrally on the roof 13 and is connected with a feed conveyor 15. At the center of the base plate 11 there are provided discharge openings 16 to which are generally connected vibrating discharge means which discharge the material on to a discharge conveyor 17.

At the top of the silo, there is provided a beam 18 which extends between a location adjacent the vertical center line of the silo to the silo wall and is so mounted that it can rotate about said center line. For this purpose, one end of the beam 18 is connected to a central rotary supporting device 19 while the other end of the beam is carried by a wheel device 20 rolling on a rail 21 which is mounted at the upper portion of the inner side of the silo wall. The beam with associated devices 19, 20 and 21 may be of a conventional design but, as opposed to previously known beams, the beam 18 according to the invention is inclined downwards towards the silo wall 12, as appears from the drawing. The inclination of the beam is at least roughly adapted to the angle of repose of the material to be stored in the silo. A screw conveyor 24 of conventional design is suspended from the beam 18 by means of two wires 22, 23. As opposed to prior art constructions, these wires are connected to winding drums on the beam 18. These drums can be operated independently of each other, such that the screw conveyor, by lengthening and shortening of the wires 22, 23, can be caused to occupy any desired angular position in the silo. Thus, it can be located in a horizontal position, which is shown approximately in the middle of the FIGURE, or in a position where it is hoisted close and parallel to the beam 18, as shown at 24'. The screw conveyor 24 may also be caused to occupy positions in which it is inclined downwardly towards the center of the silo, which is advantageous when material is to be discharged from the silo.

When the silo is to be charged, for instance with coal, the screw conveyor 24 is raised to the position adjacent the supporting beam 18, as shown at 24', and coal can then be freely fed into the silo up to a level determined by the angle of repose 25 of the coal. If, during filling of the silo, it is desirable to even out the material, the screw conveyor 24 can be lowered into engagement with the surface of the material, after it has been set at an angle in which it is assumed to operate with the greatest efficiency, whereupon it is rotated a suitable number of revolutions by means of the beam 18. When the material is discharged from the silo, it flows, as indicated by arrows, down through the discharge openings 16 with the aid of vibrating devices disposed therein and when, as a consequence, a crater has formed in the top surface of the material, the screw conveyor 24 can be lowered into engagement with this surface but is then inclined downwardly towards the center of the silo. In this manner it is possible to efficiently discharge the material. Thus, with the arrangement according to the invention advantages are gained both in the filling and in the emptying of the silo.

What I claim and desire to secure by Letters Patent is:
1. In a silo or the like for storing pulverulent, granular or lumpy material, such as coal, and comprising a side wall, a floor, a roof which is supported by said side wall at an angle of inclination that substantially corresponds to the angle of repose of the material to be stored in the silo, a central material inlet opening in said roof, at least one central discharge opening in said floor, and at least one screw conveyor which extends substantially from a central axis of the silo to a location adjacent to said side wall, a supporting beam located in said silo adjacent to said roof and rotatable about the central axis of the silo, said supporting beam being inclined downwardly from said material inlet opening toward said side wall substantially parallel to said roof, said conveyor being suspended from said beam by wires adjustable in length independently of each other.

* * * * *